United States Patent [19]

Carre

[11] Patent Number: 4,672,812
[45] Date of Patent: Jun. 16, 1987

[54] BRAKING BOOSTER SERVOMOTOR OF LIGHTENED STRUCTURE

[75] Inventor: Jean-Jacques Carre, Leraincy, France

[73] Assignee: Societe Anonyme D.B.A., Paris, France

[21] Appl. No.: 441,716

[22] Filed: Nov. 15, 1982

Related U.S. Application Data

[63] Continuation-in-part of Ser. No. 235,282, Feb. 17, 1981, abandoned.

[30] Foreign Application Priority Data

Feb. 22, 1980 [FR] France .................. 80 03951

[51] Int. Cl.⁴ ............................................. B60T 13/00
[52] U.S. Cl. ............................... 60/547.1; 91/369 A; 92/161; 92/169
[58] Field of Search .............. 92/98 D, 99, 169, 98 R, 92/100, 101, 102, 161, 169.2, 169.3, 169.4; 91/369 A, 369 B, 376 R; 60/547.1

[56] References Cited

U.S. PATENT DOCUMENTS

| | | | |
|---|---|---|---|
| 2,267,280 | 12/1941 | Kuhnel | 92/98 R |
| 2,862,365 | 12/1958 | Ingres . | |
| 3,498,189 | 3/1970 | Andres | 92/99 |
| 3,613,513 | 10/1971 | Johnson | 92/98 D |
| 3,777,625 | 12/1973 | Andres | 92/99 |
| 3,977,308 | 7/1976 | Swander | 92/169 |
| 4,246,755 | 1/1981 | Weiler | 60/549 |
| 4,270,353 | 6/1981 | Thomas | 92/98 D |

FOREIGN PATENT DOCUMENTS

| | | | |
|---|---|---|---|
| 0009393 | 4/1980 | European Pat. Off. | 92/98 D |
| 1603948 | 7/1971 | France . | |
| 2160222 | 6/1973 | France . | |
| 2421776 | 11/1979 | France . | |

Primary Examiner—Abraham Hershkovitz
Attorney, Agent, or Firm—Leo H. McCormick, Jr.; Ken C. Decker

[57] ABSTRACT

Braking booster servomotor for actuating a master cylinder and comprising at least a rigid force transmitting stirrup member disposed about the two shells constituting the casing of the servomotor, the member also contributing to the closure of the casing.

10 Claims, 4 Drawing Figures

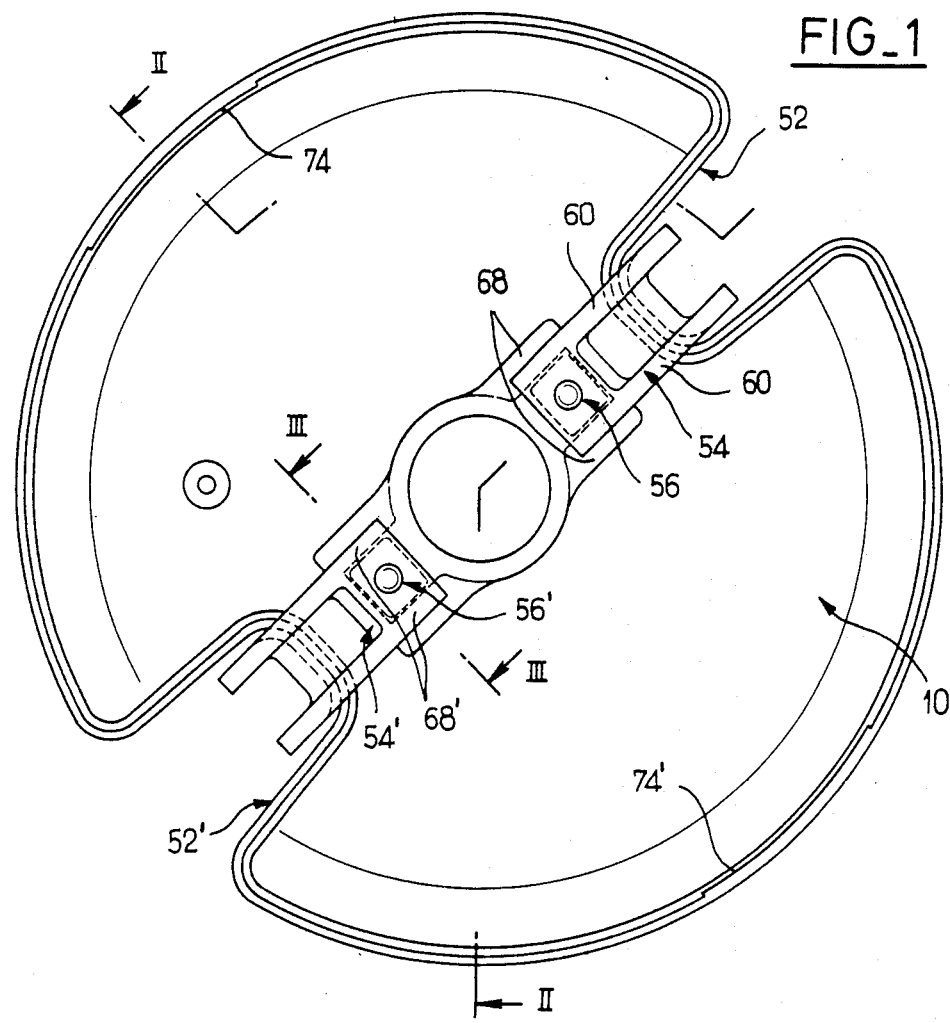
FIG_1
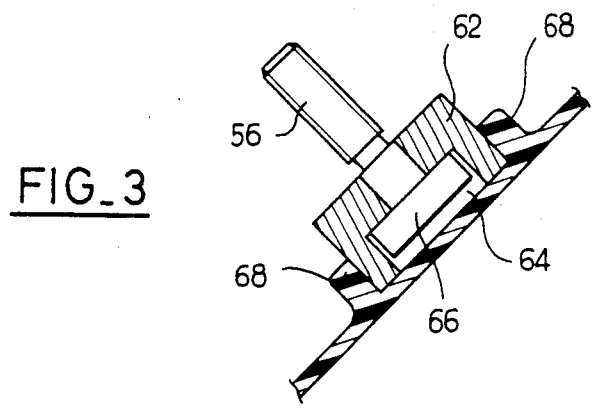
FIG_3

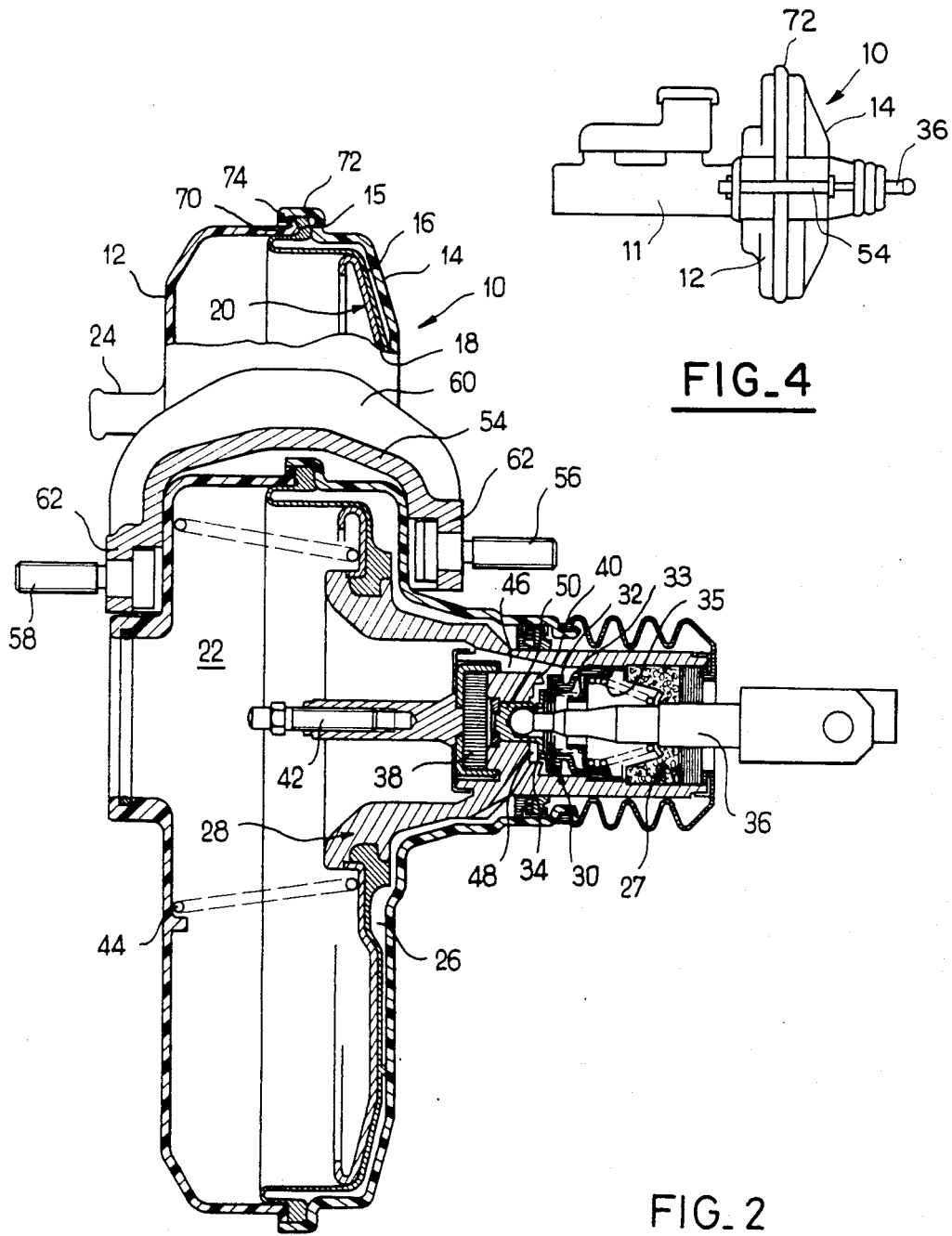

BRAKING BOOSTER SERVOMOTOR OF LIGHTENED STRUCTURE

This application is a continuation-in-part of application Ser. No. 235,282 filed Feb. 17, 1981, now abandoned.

The present invention primarily concerns a brake booster servomotor made of lightened structure and is more particularly concerned with a closure arrangement of the casing of the servomotor. The closure arrangement permits the shells to be made of lighter material, in particular plastic material, without the overall performance of the servomotor with respect to substantial forces transmitted by the driver at the moment of braking, being affected thereby.

Reducing the weight of the structural components of a motor vehicle is a constant preoccupation on the part of manufacturers. As regards the different components of the braking circuit, for many years now, the master cylinder has been associated with a booster servomotor of the vacuum type wherein the thrust rod was connected to the braking pedal by means of a suitable linkage. The casing of the servomotor has one of its faces fixed to a wall member of the vehicle and of the other face to the master cylinder. The casing both formed the support for the master cylinder and was sufficiently rigid to resist without substantial deformation the axial thrust forces transmitted to the input of the master cylinder when the driver operates the brake pedal. For this reason, the casings of vacuum-type booster servomotors have long been made of relatively thick sheet metal which is much thicker than the thickness that would normally be required in order simply to withstand the crushing forces resulting from the effect of the depression existing in the casing of the servomotor when the servomotor has not been actuated.

In order to reduce the weight of the servomotor by reducing the thickness of the sheet metal forming the casing or making the casing in another lighter material, it has already been proposed that the assembly of the servomotor and the master cylinder might be mounted to a fixed part of the vehicle, not at the location of the connection between the servomotor and the braking pedal but, in contrast, at the location of the junction between the servomotor and the master cylinder. In that case, the servomotor must be housed within the passenger compartment of the vehicle, or the assembly must be mounted by using a plurality of hoop members which form the fixing between a fixed wall member of the vehicle and the master cylinder, while passing around the servomotor. The invention approaches the latter solution, while proposing an assembly of smaller size, for a lower cost price.

For this purpose, the invention disclosed herein concerns a braking booster servomotor intended to be interposed between an actuating member and a master cylinder. The servomotor includes two shells forming a substantially cylindrical casing in which there is located an assembly forming a drive piston separating said casing into two pressure chambers. A rigid force-transmitting stirrup member comprising fixing means at each end is forcibly mounted about said shells in order to contribute to closure of the casing. The casing has at least one depression which extends substantially radially from the periphery of the casing and which forms a housing which holds the rigid stirrup member in a fixed position.

The depression makes it possible to manufacture a servomotor whose radial bulk is not increased by virtue of the provision of the stirrup members. In addition, the stirrup member contributes to closure of the casing and, in most cases, makes it possible to avoid the necessity for a peripheral crimping operation on the two shells of the casing, which constitutes an appreciable financial saving and a saving of time, in production. Since the two shell members need not be crimped together, the servomotor now becomes dismantleable.

In summary the booster servomotor has a casing formed by two shells each of which have a diametrically opposed depressed section. A mounting member has stirrups that are located in the depressed sections to attach a master cylinder to a stationary support. The stirrups carry reactionary forces that develop in the master cylinder to the stationary support without deforming or deflecting the casing.

The invention will be better appreciated and other advantages thereof will be more clearly apparent from the following description of an embodiment which is preferred at the present time, of a braking booster servomotor according to the invention, which is given solely by way of example and with reference to the accompanying non-limiting drawings in which:

FIG. 1 is a plan view of the servomotor according to the invention;

FIG. 2 is a view in section taken along line II—II of FIG. 1;

FIG. 3 is a partial view in section taken along line III—III in FIG. 1; and

FIG. 4 is a schematic illustration of the servomotor with a master cylinder attached thereto.

Referring now to the drawings and more particularly to FIGS. 2 and 4, the vacuum pneumatic booster servomotor has a casing 10 which is formed by two shells 12 and 14 which are assembled at their periphery. The periphery of the two shells 12 and 14 grip between them the outside edge portion of a flexible diaphragm 16 which forms an enlarged bead 15. The flexible diaphragm 16, rigid plate 18, form a drive piston assembly 20. The drive piston 20 divides the casing 10 into two chambers 22 and 24. The low pressure chamber 22 is in permanent communication with a vacuum source by way of a non-return valve 24. The high pressure chamber 26 is capable of being brought into communication with atmosphere by way of an air filter 27. The plate 18 is associated with a central hub member 28 which projects outwardly of the casing 10 in the direction of the actuating members of the servomotor. Disposed in the hub member 28 is a control valve device 30 of the three-way type.

The control valve 30 has an annular valve member 32 which is capable of bearing alternatively against seats 34 and 40. Seat 34 is fixed with respect to an input actuating rod 36 connected to the pedal (not shown) for operating the brakes and associated with a reaction device 38 formed by a rubber disc while seat 40 is fixed with respect to the drive piston 20. The reaction disc 38 is in contact with one end of a thrust rod 42 which is capable of operating an external actuating means (not shown) such as for example a brake master cylinder. A spring 44 which bears against the shell 12 urges the drive piston 20 toward its rest position adjacent shell 14. When the servomotor is in the rest position as illustrated, the valve member 32 is away from the seat 40 so as to permit the two chambers 22 and 26 to communicate by way of passages as shown at 46 and 48, through the hub member 28. In contrast, when the valve member 32 bears sealingly against the seat 34, the communication between atmosphere and the high pressure chamber 26 is interrupted.

The above-described part of the servomotor is conventional, and its mode of operation is as follows:

When the driver of the vehicle operates the brake pedal, the rod 36 is displaced towards the left as shown in FIG. 2 so as to permit the annular valve member 32 to bear against the seat 40 and interrupt the communication between the low pressure chamber 22 and the high pressure chamber 26. Thereafter the valve member 32 moves away from the seat 34 to permit atmospheric air to pass through the filter 27 and the central part of the valve member 32 into the high pressure chamber 26 by way of the passage 48. A pressure difference is generated between the two chambers 22 and 26, which causes the drive piston 20 to be moved towards the left, displacing the thrust rod 42 and causing actuation of the master cylinder (not shown). A reaction force is transmitted from the thrust rod 42 to the input rod 36 by way of the disc 38 acting on an extension portion 50 of the seat 34. In the event of failure of the servomotor, for example due to a lack of vacuum, the driver of the vehicle can continue to operate the master cylinder, at the expense of a greater force applied to the brake pedal. The input rod 36 is pushed inwardly, which urges the extension portion 50 against the transmission disc 38 which transmits the force to the thrust rod 42 which cooperates with the master cylinder.

According to the invention (FIG. 1), the casing 10 is provided with two diametrically opposed depressions 52, 52' which extend substantially radially from the periphery. Each depression 52, 52' forms a housing for receiving a rigid force-transmitting bracing or stirrup member 54, 54'. Each stirrup member 54, 54' has fixing means at each end thereof in the form of screws 56 and 58. The threaded part of the screws 56 and 58 project outwardly from the two main faces of the casing 10. The screws 56, only one is shown, permit the members 54, 54' to be fixed to a fixed wall member of the vehicle while the screws 58, only one is shown, permit mounting of the master cylinder 11 shown in FIG. 4.

Each stirrup member 54, 54' is cast in a light alloy which has lateral ribs 60 for increasing its rigidity. Its general shape is that of a U of which the two parallel limbs 62 carry the two screws 56 and 58 respectively. The two limbs 62, 62' are provided on their opposite internal faces with rectangular recesses 64 (see FIG. 3) which prevent the screws 56 and 58 from rotating, the screws being provided with square or rectangular heads 66 for that purpose.

The outside faces of the shells 12 and 14 have positioning sliding guides 68, 68' which are formed integrally with the shells. The guides 68, 68' toward the center of the main faces of the shells and are in alignment with the depressions 52, 52' to receive the parallel limbs 62, 62' and hold stirrup members 54, 54' parallel.

The distance between the parallel limbs 62, 62' of each member 54, 54' is slightly less than the natural thickness of the casing 10. Each member 54, 54' is forcibly mounted about the shells 12 and 14 in order to contribute to closure of the casing 10.

The expression "natural thickness" denotes the axial distance between the main opposite outside faces of the shells 12 and 14 and more particularly the regions thereof against which the stirrup members 54, 54' bear, when the shells 12 and 14 are not resiliently deformed and when the peripheral bead 15 of the diaphragm 16 has not been compressed. When the two members 54, 54' are forcibly mounted about the shells 12 and 14, they cooperate therewith to participate in comprising bead 15 of the diaphragm 16 between the assembly edges 70 and 72 of the shells 12 and 14 to seal chambers 22 and 26 from the surrounding environment.

It will be noted that the simple force fitting of the two stirrup members 54, 54' on the casing is sufficient, on its own, to finish the assembly of the different components of the servomotor. The force-fit of the stirrup members 54, 54' which also causes the diaphragm to be sealed at its periphery by compression of the bead 15 is also accompanied in most cases by slight resilient deformation of the shells 12 and 14.

Although the peripheral crimping of the edges 70 and 72 is not absolutely essential, it is possible to provide cooperating crimping between the edges 70 and 72 by bending tab 74 over a part of their periphery on shell 14. As seen in FIG. 1, the cooperating crimping extend only over two diametrically opposed edge portions which are preferably substantially equidistant from the depressions 52. This partial crimping configuration is advantageous in regard to servomotors of large diameter.

It will be appreciated that the invention is not limited to the above-described embodiment but includes all technical equivalents of the means used if they are such, within the scope of the following claims:

I claim:

1. A brake booster servomotor located between an actuation member and a master cylinder, comprising:
    a first shell having a first end plate with a substantially cylindrical body extending therefrom, said first cylindrical body having a first peripheral surface thereon;
    a second shell having a second end plate with a substantially cylindrical body extending therefrom, said second cylindrical body having a second peripheral surface thereon, said first and second peripheral surfaces being connected to define a substantially cylindrical casing;
    said casing having at least one depression extending substantially radially from the cylindrical body;
    a movable assembly forming a drive piston which divides said casing into two pressure chambers; and
    a rigid substantially U-shaped stirrup member having first and second arm portions provided with fixing means, said stirrup member being forcibly mounted in said depression with said first arm in contact engagement with said first end plate and said second arm in contact engagement with said second end plate to contribute to the closure of said casing, said stirrup member transferring reaction forces directly from the master cylinder to the actuation member without effecting the connection between the first and second cylindrical body.

2. A booster servomotor according to claim 1, wherein said drive piston-forming assembly includes a flexible diaphragm, the outer edge of the diaphragm is gripped between the first and second peripheral surfaces of said first and second shells and said stirrup member cooperates with said shells to participate in gripping said diaphragm between said first and second peripheral surfaces.

3. A booster servomotor according to claim 2, wherein said outer edge of said diaphragm has an enlarged bead formed integrally therewith, said bead is compressed resiliently between said assembly edges when said stirrup member is forcibly fitted.

4. A booster servomotor according to claim 1, comprising two said stirrup members housed in diametrically opposed said depressions on said cylindrical body.

5. A booster servomotor according to claim 4 comprising slide guides for positioning said stirrup members, the guides being formed integrally with said first and second end plates and extending substantially in line with said depressions.

6. A booster servomotor according to claim 1, wherein the peripheral surfaces of said two shells are provided with crimping means extending over at least a part thereof.

7. A booster servomotor according to claim 4, wherein the peripheral surfaces of said two shells are provided with crimping means extending over two substantially diametrically opposed edge portions which are substantially equi-distant from said depressions.

8. A brake booster assembly of a vehicle having a dash board and a brake pedal comprising:
   a brake master cylinder connected to the housing;
   a diaphragm power piston positioned in said housing and dividing the housing into first and second fluid chambers and having a retracted position defined by abutment with the housing;
   a control valve mechanism for the diaphragm power piston for controlling a pressure differential between the chambers in response to movement of said brake pedal axially relative to the power piston; and
   at least two bolt members which extend from the master cylinder bypassing outside of the housing to said dash board of said vehicle for installation such that a brake reactional force is transmitted from the master cylinder to the dash board bypassing the housing wherein the housing is contoured so as to have a pair of recessed portions locted symmetrically with respect to the center of the housing and the two bolt members pass through the recessed portions from the master cylinder to the dash board with both ends in thread and nut connection with the master cylinder and the dash board, respectively, whereby the housing is clamped between the master cylinder and the dash board.

9. An assembly according to claim 8, wherein the two bolt members each further comprise a washer at one end thereof adjacent the dash board, said washers being interposed between the dash board and the housing so that the housing is clamped across the washers between the master cylinder and the dash board.

10. An assembly according to claim 9 wherein the master cylinder further comprises a flange and the two bolt members are in the thread and nut connection with the flange, respectively.

* * * * *